US008271408B2

(12) United States Patent
Sellamanickam et al.

(10) Patent No.: US 8,271,408 B2
(45) Date of Patent: Sep. 18, 2012

(54) PAIRWISE RANKING-BASED CLASSIFIER

(75) Inventors: Sundararajan Sellamanickam, Bangalore (IN); Sathiya Keerthi Selvaraj, Cupertino, CA (US); Priyanka Garg, Jaipur (IN)

(73) Assignee: Yahoo! Inc., Sunnyvale, CA (US)

( * ) Notice: Subject to any disclaimer, the term of this patent is extended or adjusted under 35 U.S.C. 154(b) by 572 days.

(21) Appl. No.: 12/603,763

(22) Filed: Oct. 22, 2009

(65) Prior Publication Data

US 2011/0099131 A1 Apr. 28, 2011

(51) Int. Cl.
G06F 15/18 (2006.01)
G06N 5/02 (2006.01)
(52) U.S. Cl. ............................................ 706/12; 706/54
(58) Field of Classification Search ...................... 706/12
See application file for complete search history.

(56) References Cited

U.S. PATENT DOCUMENTS 7,440,944 B2 * 10/2008 Selvaraj et al. ........................ 1/1
7,496,549 B2 * 2/2009 Selvaraj ............................ 706/25
7,562,060 B2 * 7/2009 Sindhwani et al. ............. 706/25
7,630,945 B2 * 12/2009 Selvaraj et al. .................. 706/45
7,836,000 B2 * 11/2010 Chapelle et al. ................. 706/20
7,949,622 B2 * 5/2011 Sellamanickam et al. ....... 706/20

OTHER PUBLICATIONS

The Effect of Target Vector Selection on the Invariance of Classifier Performance Measures, Sakk, E.; Schneider, D.J.; Myers, C.R.; Cartinhour, S.W., Neural Networks, IEEE Transactions on vol. 20 , Issue: 5 Digital Object Identifier: 10.1109/TNN.2008.2011809 Publication Year: 2009 , pp. 745-757.*
Research on short text classification for web forum, Xiaochun He; Conghui Zhu; Tiejun Zhao Fuzzy Systems and Knowledge Discovery (FSKD), 2011 Eighth International Conference on vol. 2 Digital Object Identifier: 10.1109/FSKD.2011.6019652 Publication Year: 2011 , pp. 1052-1056.*
Musical instrument recognition by pairwise classification strategies, Essid, S.; Richard, G.; David, B. Audio, Speech, and Language Processing, IEEE Transactions on vol. 14 , Issue: 4 Digital Object Identifier: 10.1109/TSA.2005.860842 Publication Year: 2006 , pp. 1401-1412.*
Using classification and key phrase extraction for information retrieval, Minjuan Zhong; Zhiping Chen; Yaping Lin; Jintao Yao Intelligent Control and Automation, 2004. WCICA 2004. Fifth World Congress on vol. 4 Digital Object Identifier: 10.1109/WCICA.2004. 1343076 Publication Year: 2004 , pp. 3037-3041 vol. 4.*

* cited by examiner

Primary Examiner — Michael B Holmes
(74) Attorney, Agent, or Firm — James Woods; Mauriel Kapouytian & Treffert LLP

(57) ABSTRACT

The present invention provides methods and systems for binary classification of items. Methods and systems are provided for constructing a machine learning-based and pairwise ranking method-based classification model for binary classification of items as positive or negative with regard to a single class, based on training using a training set of examples including positive examples and unlabelled examples. The model includes only one hyperparameter and only one threshold parameter, which are selected to optimize the model with regard to constraining positive items to be classified as positive while minimizing a number of unlabelled items classified as positive.

22 Claims, 4 Drawing Sheets

PAIRWISE RANKING-BASED CLASSIFIER

BACKGROUND

Machine learning-based classifiers have a variety of important uses, including, for example, classification of Web documents. Traditionally, binary classifiers have been built using manually collected sets of positive and negative examples. Collecting the labeled data is highly time consuming and requires a large amount of human effort. For example, this is notably true in classification problems, including, for example, web page classification, where the negative class is defined as the universe excluding the positive examples. For the negative class, it is difficult and time-consuming to create a set of examples which would represent the real world distribution. For example, to build a classifier that identifies pages containing reviews of entities such as businesses and products, the negative class will include all web pages excluding review pages. There is no clear and efficient way to describe and sample documents from this class. Generally, the goal is to identify the positive set of examples from the larger universal set.

Some approaches address problems that may be associated with labeling of negative class examples by building classifiers using positive and unlabeled examples. In such approaches, essentially, the unlabeled examples are labeled as negative examples. Conventional binary classifiers are then built. Such approaches avoid the effort and difficulty required to label the negative set of examples. However, issues such as the presence of positive examples in the unlabeled set and a high imbalance in the ratio of positive to negative examples bring in challenges in building these classifiers, and existing approaches are generally computationally expensive.

There is a need for efficient machine-learning-based classifiers for binary classification of items, using positive and unlabelled examples.

SUMMARY

The present invention provides methods and systems for binary classification of items. Methods and systems are provided for constructing a machine learning-based and pairwise ranking method-based classification model for binary classification of items as positive or negative with regard to a single class based on training using a training set of examples including positive examples and unlabelled examples. The model includes only one hyperparameter and only one threshold parameter, which are selected to optimize the model with regard to constraining positive items to be classified as positive while minimizing a number of unlabelled items classified as positive.

DETAILED DESCRIPTION

Figure 1:
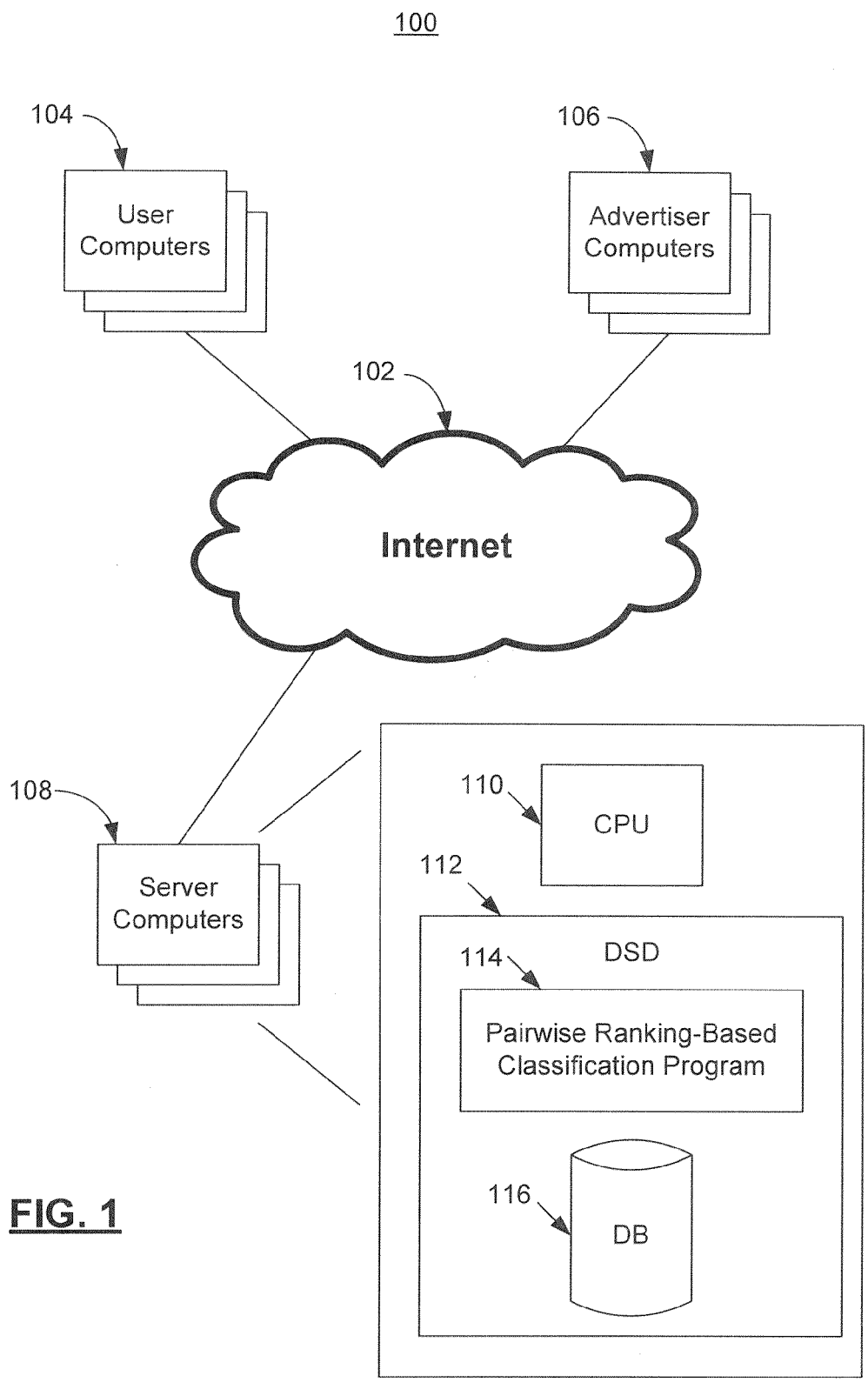
FIG. 1 is a distributed computer system according to one embodiment of the invention.

Some embodiments of the invention provide a machine learning-based binary classifier, or binary classification model, for classification of items based on a training set of positive and unlabelled examples. Models according to embodiments of the invention utilize a pairwise ranking technique, which can involve determining a preference or choice between two mutually distinct alternatives.

Some embodiments of the invention utilize the observation that, with positive and unlabelled examples, if the sample size is large enough, then it can be possible to generate a good classifier by minimizing the number of unlabelled examples classified as positive while constraining the positive examples to be correctly classified. Some embodiments of the invention use this concept and incorporate a pairwise ranking technique with positive and unlabelled examples as a training set.

In some embodiments, models or classifiers are provided in which a score of a positive example is encouraged to be higher than a score for an unlabelled example. Generally, a high enough score will be associated with classification of an example or item as being positive with regard to the class. A threshold parameter can be utilized in a decision function in setting a threshold in this regard. It is to be understood that, as used herein, terms such as "higher score" and the like are to be broadly construed. For example, a "score", as used herein, can be any form) of scaled or degreed rating. Furthermore, "higher", as used herein, broadly includes any rating, whether numerical or otherwise, that means or suggests a higher degree of matching to a particular category or a higher tendency to be associated with a particular category.

In some embodiments, a model is provided that includes an objective function, or scoring function, including a single hyperparameter, and a decision function including a single threshold parameter. The hyperparameter and threshold parameter are selected or optimized so as to constrain positive examples to be labeled correctly while minimizing the number of unlabelled examples labeled as positive. In some embodiments, optimizing the objective function includes minimizing the objective function.

Ranking, such as in terms of relevance, is an important problem in various applications such as Web page ranking and information retrieval. For example, in a web page ranking problem the training data can consist of a number of queries, and for each query, an associated set of documents. For each (query, document) pair there is a feature vector xi, i=1 ... n, and relevant judgment of the document.

In some embodiments, each feature is identified by a number and corresponding weight. For example, the word "Washington" can be identified as feature number 1; then the first element in the associated weight vector is the weight associated with this feature. Features need not be word-based, of course, and can include other types of features. For example, the number of images in a page can be a feature.

One ranking problem is to build a model that ranks a set of documents based on relevance scores for a given query. Embodiments of the invention utilize a pairwise ranking method, although embodiments of the invention are contemplated in which other methods are utilized. Although the invention contemplates various types of pairwise ranking methods, in some embodiments, a Support Vector Machine ("SVM")-based pairwise ranking method is utilized, which is referred to hereinafter as "RankSVM".

In some embodiments, first, a set of preference pairs Q is constructed by comparing the relevance of the documents associated with a given query. If $(i, j) \in Q$ then document i is preferred over document j. The Rank SVM model can then be built by minimizing the following objective function:

$$f(w) = \tfrac{1}{2}\|w\|^2 + C\Sigma[\text{over}((i,j)\in Q)]g(w^T x_i - w^T x_j) \qquad (1)$$

In equation (1), f(w) is the objective function, w is the weighting parameter, and $g(w^T xi - w^T xj)$ is any suitable loss function. C is the (single) hyperparameter.

A RankSVM method forms a ranking model by minimizing a regularized margin-based pairwise loss as given in Equation (1). A binary classification context corresponds to a simpler case of a more general ranking model, with a single query and two relevance values. The given n examples can be partitioned into two sets that define a binary classification problem: $A = \{i : x_i$ is in the higher relevance class$\}$ and $B = \{i : x_i$ is in the lower relevance class$\}$. In this context, one sets A=P and B=U; that is, the labeled positive examples belong to the higher relevance class and the unlabeled examples belong to the lower relevance class. Then, from equation (1), one arrives at the following objective function:

$$f(w) = \tfrac{1}{2}\|w\|^2 + C\Sigma[\text{over}(i \epsilon P, j \epsilon U)] g(w^T xi - w^T xj) \qquad (2)$$

As with Equation (1), $g(w^T xi - w^T xj)$ can be any suitable loss function. Typical loss functions include:

$$g(t) = \max(0, 1-t), \text{ and} \qquad (L1)$$

$$g(t) = \max(0, 1-t)^2 \qquad (L2)$$

Although L1 or L2 can be used, in some embodiments, L2 is used as the loss function.

In some embodiments, the objective function, Equation (2), is optimized efficiently using Truncated Newton training of SVM.

The solution obtained from optimized Equation (2) can be used to compute scores of a pair of examples and compute their relevance.

Although many variations are possible, some embodiments of the invention use the following decision function:

$$j(x) = w^T x + \theta \qquad (3)$$

In equation (3), h(x) is the decision function, w is the weighting parameter, and θ is the threshold parameter.

The choice of the hyperparameter C and the threshold parameter θ play important roles in the classification performance. They can be selected using standard 5-fold cross-validation (CV) technique by computing a suitable measure.

Some embodiments use only one hyperparameter in an objective function, used for scoring of items, and only one threshold parameter, used in a decision function used for classification of documents based at least in part on associated scores.

Various methods can be used to optimize C and θ. In some embodiments, an F-score-like optimization technique is used, as generally presented in the published article, B. Liu, Y. Dai, X. Li, W. S. Lee, and P. S. Yu. Building text classifiers using positive and unlabeled examples. In ICDM '03: *Proceedings of the Third IEEE International Conference on Data Mining*, pages 179-186. IEEE Computer Society, 2003. That article is hereby incorporated herein by reference in its entirety.

In some embodiments, a AUC (Area under the ROC) technique may be used to optimize C and θ, as generally described in T. Joachims. A support vector method for multivariate performance measures. In ICML '05: *Processing International conference on Machine learning*, pages 377-384, New York, N.Y., USA, 2005. ACM. That article is hereby incorporated herein by reference in its entirety.

FIG. 1 is a distributed computer system 100 according to one embodiment of the invention. The system 100 includes user computers 104, advertiser computers 106 and server computers 108, all coupled or coupleable to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, programs, algorithms and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, and software to enable searching, search results and advertising, such as graphical or banner advertising as well as keyword searching and advertising in a sponsored search context.

As depicted, each of the server computers 108 includes one or more CPUs 110 and a data storage device 112. The data storage device 112 includes a database 116 and a pairwise ranking-based classification program 114.

The program 114 is intended to broadly include all programming, applications, software, algorithms and other and tools necessary to implement or facilitate methods and systems according to embodiments of the invention. The elements of the program 114 may exist on a single computer or device, or may be distributed among multiple computers or devices.

Figure 2:
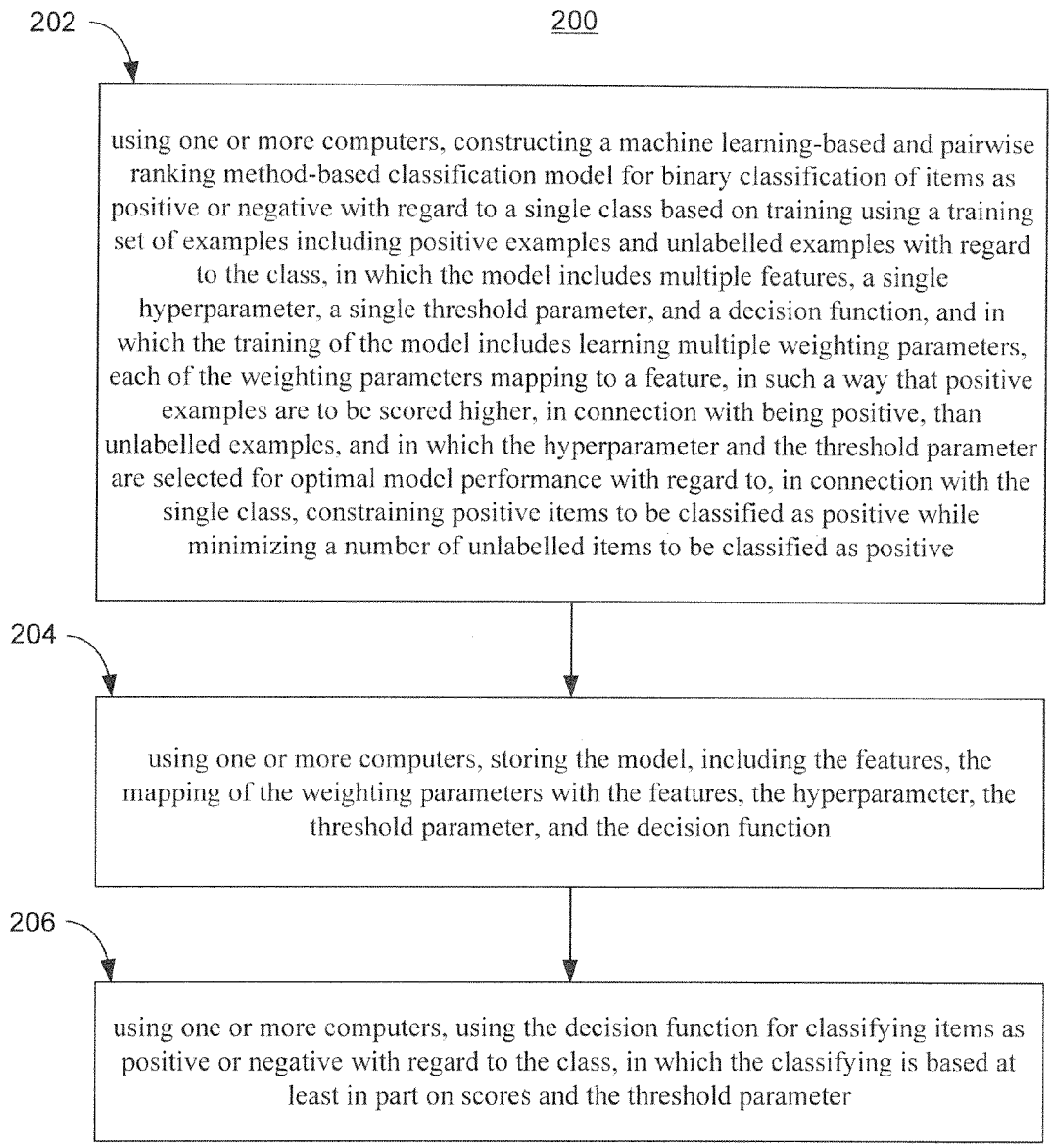
FIG. 2 is a flow diagram illustrating a method according to one embodiment of the invention.

FIG. 2 is a flow diagram illustrating a method 200 according to one embodiment of the invention. At step 202, using one or more computers, a machine learning-based and pairwise ranking method-based classification model is constructed for binary classification of items as positive or negative with regard to a single class based on training using a training set of examples including positive examples and unlabelled examples with regard to the class. The model includes multiple features, a single hyperparameter, a single threshold parameter, and a decision function. Training of the model includes learning multiple weighting parameters, each of the weighting parameters mapping to a feature, in such a way that positive examples are to be scored higher, in connection with being positive, than unlabelled examples. The hyperparameter and the threshold parameter are selected for optimal model performance with regard to, in connection with the single class, constraining positive items to be classified as positive while minimizing a number of unlabelled items to be classified as positive.

At step 204, using one or more computers, the model is stored, including the features, the mapping of the weighting parameters with the features, the weighting parameters, the hyperparameter, the threshold parameter, and the decision function. Herein, the term "mapping" is intended to broadly include any of various forms of association and indications or representations of association.

At step 206, using one or more computers, the decision function is used for classifying items as positive or negative with regard to the class. The classifying is based at least in part on scores and the threshold parameter.

Figure 3:
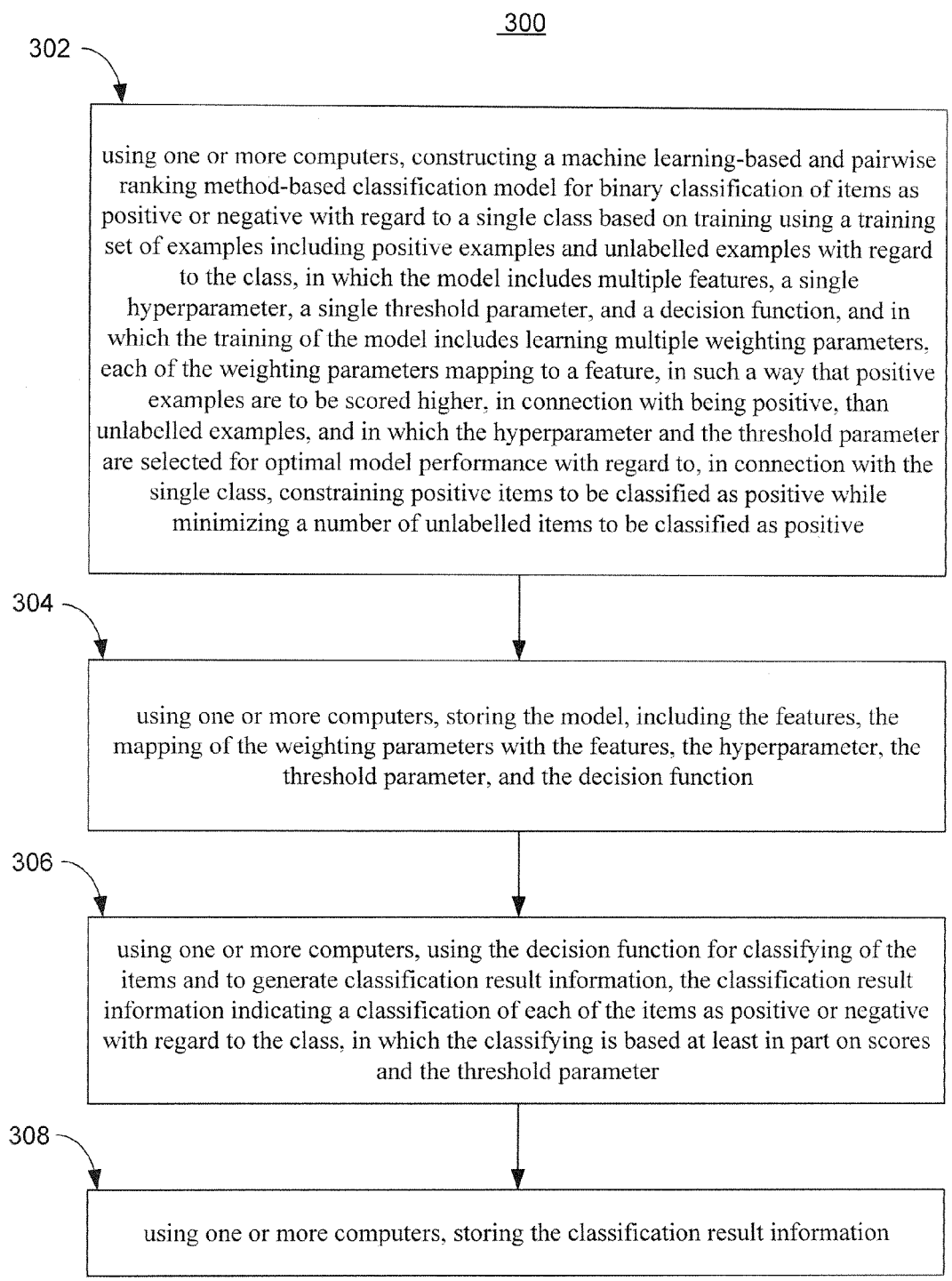
FIG. 3 is a flow diagram illustrating a method according to one embodiment of the invention.

FIG. 3 is a flow diagram illustrating a method 300 according to one embodiment of the invention. Steps 302 and 304 are similar to steps 202 and 204 of FIG. 2.

At step 306, using one or more computers, the decision function is used for classifying of the items and to generate classification result information. The classification result information indicates a classification of each of the items as positive or negative with regard to the class. The classifying is based a least in part on scores and the threshold parameter.

At step 308, using one or more computers, the classification result information is stored, such as in the database 116 as depicted in FIG. 1.

Figure 4:
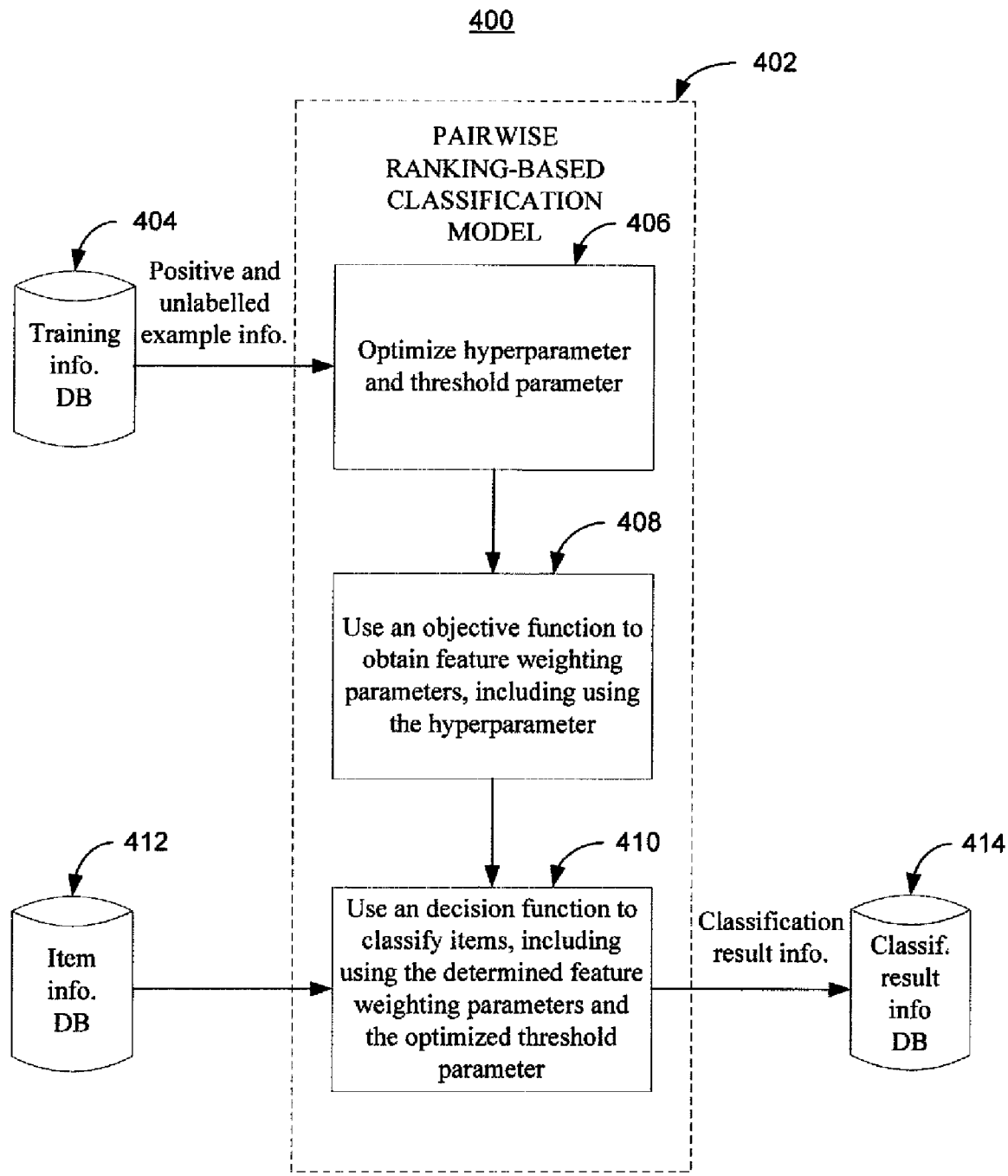
FIG. 4 is flow diagram illustrating a method according to one embodiment of the invention.

FIG. 4 is a flow diagram illustrating a method 400 according to one embodiment of the invention. Depicted elements include a pairwise ranking-based classification model 402, a training information database 404, an item information database 412 and a classification result information database 414.

Steps 406, 408 and 410 of FIG. 4 represent steps performed utilizing, or in connection with, the model 402. In various embodiments, the boundaries of elements and actions considered part of, or associated with, the model 402 can vary, and the depicted elements of the model 402 are merely exemplary and intended to provide a conceptual illustration of one embodiment. The steps 406, 408, and 410 are not intended to be comprehensive. Furthermore, the steps 406, 408 and 410, while depicted separately, may overlap, be mixed together, be mixed with other functionally, etc.

As depicted, input information to the model 402 includes information from the training information database 404 and the item information database 412.

Step 406 represents hyperparameter optimization and threshold parameter optimization.

Step 408 represents using an objective function to obtain feature weighting parameters, including using the hyperparameter.

Step 410 represents using a decision function to classify items, including using the determined feature weighting parameters and the optimized threshold parameter.

As depicted, classification result information is output from the model 402 and stored in the classification result information database 414.

One form of algorithm according to an embodiment of the invention is generally illustrated, in a non-limiting fashion, as follows.

First, set $c^-=\{C_{min}, \ldots, 0.001, 0.002, 0.004, \ldots, C_{max}\}$, using a 5-fold ($N_f=5$) cross-validation (CV) technique.

Next, partition the dataset P and U into $N_f$ partitions:

$$Q^{(i)}=(P^{(i)}, U^{(i)}, i=1, \ldots, N_f.$$

Next, for each hyperparameter $C \in C^-$, the following is performed. First, perform $N_f$-fold CV with the F^ score using the partitions $\{Q^{(i)}, i=1, \ldots, N_f\}$. This can include solving Equation (2) using any pairwise RankSVM method for each split of the training set $(P-P^{(i)}, U-U^{(i)})$, and computing predictions $f^{(i)}(x_j), \{j, j \in Q^{(i)}\}$.

Next, find the optimal threshold value θ that maximizes the average F^ score using the predictions.

Next, find the best C value (C*) that maximizes the F^ score using the predictions.

Next, solve Equation (2) using the entire dataset {P, U} using C*

Next, output values for w and θ, which can be used in the decision function for classification of items.

The foregoing description is intended merely to be illustrative, and other embodiments are contemplated within the spirit of the invention.

The invention claimed is:

1. A method comprising:
using one or more computers, constructing a machine learning-based and pairwise ranking method-based classification model for binary classification of items as positive or negative with regard to a single class based on training using a training set of examples comprising positive examples and unlabelled examples with regard to the class;
wherein the model comprises a plurality of features, a single hyperparameter, a single threshold parameter, and a decision function;
and wherein the training of the model comprises learning a plurality of weighting parameters, each of the plurality of weighting parameters mapping to a feature of the plurality of features, in such a way that positive examples are to be scored higher, in connection with being positive, than unlabelled examples;
and wherein the hyperparameter and the threshold parameter are selected for optimal model performance with regard to, in connection with the single class, constraining positive items to be classified as positive while minimizing a number of unlabelled items to be classified as positive;
using one or more computers, storing the model, comprising the features, the mapping of the weighting parameters with the features, the weighting parameters, the hyperparameter, the threshold parameter, and the decision function; and
using one or more computers, using the decision function for classifying items as positive or negative with regard to the class, wherein the classifying is based at least in part on scores and the threshold parameter.

2. The method of claim 1, wherein classifying an item as positive is based at least in part on a score associated with the item being sufficiently high.

3. The method of claim 1, wherein classifying items comprises classifying documents.

4. The method of claim 1, wherein the model uses word-based features.

5. The method of claim 1, wherein the model comprises an objective function including the hyperparameter.

6. The method of claim 5, comprising minimizing the objective function.

7. The method of claim 5, wherein the objective function is for use in obtaining scores relating to pairwise ranking of items, and wherein the decision function is for use in deciding on a class for an item based at least in part on the scores.

8. The method of claim 1, comprising using a support vector machine-based pairwise ranking method.

9. The method of claim 1, wherein the objective function comprises a first term and a second term, the first term comprising a square of weighting parameters, and the second term comprising the hyperparameter and a summation, over a set of example pairs, of a loss function.

10. The method of claim 9, wherein the decision function comprises a first term comprising weighting parameters, and a second term comprising the threshold parameter.

11. The method of claim 1, comprising obtaining feature information regarding items, and comprising using the feature information with the model in classifying the items.

12. A system for use in an online advertising exchange, comprising
one or more server computers coupled to the Internet; and
one or more databases coupled to the one or more server computers;
wherein the one or more server computers are for:
constructing a machine learning-based and pairwise ranking method-based classification model for binary classification of items as positive or negative with regard to a single class based on training using a training set of examples comprising positive examples and unlabelled examples with regard to the class;
  wherein the model comprises a plurality of features, a single hyperparameter, a single threshold parameter, and a decision function;
  and wherein the training of the model comprises learning a plurality of weighting parameters, each of the plurality of weighting parameters mapping to a feature of the plurality of features, in such a way that positive examples are to be scored higher, in connection with being positive, than unlabelled examples;
  and wherein the hyperparameter and the threshold parameter are selected for optimal model performance with regard to, in connection with the single class, constraining positive items to be classified as positive while minimizing a number of unlabelled items to be classified as positive;
storing the model, comprising the features, the mapping of the weighting parameters with the features, the weighting parameters, the hyperparameter, the threshold parameter, and the decision function, in at least one of the one or more databases; and
using the decision function for classifying items as positive or negative with regard to the class, wherein the deciding is based at least in part on scores and the threshold parameter.

13. The system of claim 12, wherein classifying an item as positive is based at least in part on a score associated with the item being sufficiently high.

14. The system of claim 12, wherein classifying items comprises classifying documents.

15. The system of claim 12, wherein the model comprises an objective function including the hyperparameter.

16. The system of claim 12, comprising minimizing the objective function.

17. The system of claim 12, wherein the objective function is for use in obtaining scores relating to pairwise ranking of items, and wherein the decision function is for use in deciding on a class for an item based at least in part on the scores.

18. The system of claim 12, comprising using a support vector machine-based pairwise ranking method.

19. The system of claim 12, wherein the objective function comprises a first term and a second term, the first term comprising a square of weighting parameters, and the second term comprising the hyperparameter and a summation, over a set of example pairs, of a loss function.

20. The system of claim 19, wherein the decision function comprises a first term comprising weighting parameters, and a second term comprising the threshold parameter.

21. The system of claim 12, comprising obtaining feature information regarding items, and comprising using the feature information with the model in classifying the items.

22. A computer readable medium or media containing instructions for executing a method comprising:
  using one or more computers, constructing a machine learning-based and pairwise ranking method-based classification model for binary classification of items as positive or negative with regard to a single class based on training using a training set of examples comprising positive examples and unlabelled examples with regard to the class;
    wherein the model comprises a plurality of features, a single hyperparameter, a single threshold parameter, and a decision function;
    and wherein the training of the model comprises learning a plurality of weighting parameters, each of the plurality of weighting parameters mapping to a feature of the plurality of features, in such a way that positive examples are to be scored higher, in connection with being positive, than unlabelled examples;
    and wherein the hyperparameter and the threshold parameter are selected for optimal model performance with regard to, in connection with the single class, constraining positive items to be classified as positive while minimizing a number of unlabelled items to be classified as positive;
  using one or more computers, storing the model, comprising the features, the mapping of the weighting parameters with the features, the weighting parameters, the hyperparameter, the threshold parameter, and the decision function;
  using one or more computers, using the decision function for classifying the items and to generate classification result information, the classification result information indicating a classification of each of the items as positive or negative with regard to the class, wherein the classifying is based at least in part based at least in part on scores and the threshold parameter; and
  using one or more computers, storing the classification result information.

* * * * *